US 6,718,684 B2

(12) United States Patent
Yong-Set (10) Patent No.: US 6,718,684 B2
(45) Date of Patent: Apr. 13, 2004

(54) FISHING LURE WITH ADJUSTABLE AND MOVABLE WEIGHT SYSTEM (76) Inventor: Bernard Yong-Set, 63 Chapel Park Square, Toronto, Ontario (CA), MIV 2S3

( * ) Notice: Subject to any disclaimer, the term of this patent is extended or adjusted under 35 U.S.C. 154(b) by 0 days.

(21) Appl. No.: 10/318,051

(22) Filed: Dec. 13, 2002

(65) Prior Publication Data

US 2003/0110678 A1 Jun. 19, 2003

Related U.S. Application Data (60) Provisional application No. 60/339,825, filed on Dec. 17, 2001.

(51) Int. Cl.[7] .............................................. A01K 85/00
(52) U.S. Cl. ..................................... 43/42.39; 43/42.44
(58) Field of Search ........................ 43/42.08, 36, 37, 43/42.39, 42.41, 42.44, 42.22

(56) References Cited

U.S. PATENT DOCUMENTS

| 1,254,397 | A | * | 1/1918 | Dickens | 43/42.39 |
| 1,857,939 | A | * | 5/1932 | Cameron | 43/42.39 |
| 2,616,207 | A | * | 11/1952 | Shadley | 43/37 |
| 4,287,679 | A | * | 9/1981 | Klotz | 43/42.09 |
| 4,477,994 | A | * | 10/1984 | Erickson | 43/42.44 |
| 5,564,216 | A | * | 10/1996 | McMillan | 43/36 |
| 5,992,084 | A |   | 11/1999 | Kitagawa | |

* cited by examiner

Primary Examiner—Kurt Rowan
(74) Attorney, Agent, or Firm—Ridout & Maybee LLP (57) ABSTRACT

A fishing lure comprises a lure body having means for attachment to a fishing line at its front end, one or more fish hooks, and one or more weights mounted along the lower surface of the lure body. The weights are retained along the lower surface of the lure body by a releasable weight mounting means, preferably in the form of a resilient wire, having a fixed end and a movable end which is releasably secured to the lure body. The weights are movable along the mounting means to shift the center of gravity of the lure body toward the front end or the rear end, and release of the movable end of the mounting means from the lure body permits the addition or removal of weights, thereby permitting adjustment of the weight of the lure.

20 Claims, 7 Drawing Sheets

FISHING LURE WITH ADJUSTABLE AND MOVABLE WEIGHT SYSTEM

This application claims the benefit of provisional No. 60/339,825 filed on Dec. 17, 2001.

FILED OF THE INVENTION

The present invention relates to fishing lures, and in particular to fishing lures having movable weights.

BACKGROUND OF THE INVENTION

One problem with lures for sport fishing is that different conditions require lures with variable depth running characteristics. In order to adapt to different conditions, the same style of fishing lure may be available as a floating lure, a shallow running lure, a medium depth running lure, or as a sinking, deep running lure. In order to fish under various conditions, the sport fisherman is forced to purchase a wide variety of lures, and may also be forced to frequently change lures while fishing in order to adapt to various conditions.

Although it is possible to attach weights to the fishing line ahead of the lure, this is generally undesirable as it may interfere with the lure action.

One of the more popular styles of fishing lure is one which imitates a bait fish, generally having a long body of a buoyant material such as plastic or wood. This type of fishing lure is generally weighted so that its center of gravity is toward the front end of the lure and is provided with a diving lip at its front end, which provides the lure with its characteristic wobble as it is pulled through the water.

One disadvantage of the bait fish style lure is that it is cast tail-first into the water. This tends to reduce the distance of the cast, and causes the weighted front end to turn around in the air, resulting in increased incidence of line tangling. Furthermore, the forward-facing diving lip may increases wind resistance of the lure, thereby reducing the casting distance.

This problem has been partially overcome by lures with movable internal weight systems which permit the center of gravity of the lure to be shifted from the front toward the back during casting so that the lure will travel through the air tail first and with the diving lip directed away from the direction of the cast. As the lure is pulled through the water, the weights are shifted toward the front of the lure to provide the lure with the desired swimming action. One example of such a lure is disclosed in U.S. Pat. No. 5,992,084 (Kitagawa), issued on Nov. 30, 1999.

One problem with lures having internal movable weight systems is that the weights may not be mounted low enough in the lure body to provide the desired swimming action, and therefore these types of lures have an increased tendency to "roll" in the water. Furthermore, the weights in the Kitagawa lure are enclosed within the lure body, and therefore it is not possible to adjust the weight of the lure.

SUMMARY OF THE INVENTION

The present invention overcomes the above-mentioned problems of the prior art by providing a fishing lure with a movable weight system, in which weights can be removed from or added to the fishing lure in a manner which permits adjustment of the lure's running depth without adversely impacting the desired swimming action.

In one aspect, the present invention provides a fishing lure, comprising: a lure body having a longitudinal axis, a front end, rear end, upper surface and lower surface; means for attachment of a fishing line provided at the front end of the lure body; one or more fish hooks attached to the lure body; one or more weights mounted along the lower surface of the lure body; a releasable weight mounting means for retaining the one or more weights along the lower surface of the lure body, wherein the one or more weights are movable along the mounting means to shift a center of gravity of the lure body toward the front end or the rear end, and wherein the releasable mounting means is at least partially detachable from the lure body to release the one or more weights from the lower surface of the lure body.

BRIEF DESCRIPTION OF THE DRAWINGS

The invention will now be described, by way of example only, with reference to the accompanying drawings, in which.

DETAILED DESCRIPTION OF PREFERRED EMBODIMENTS

Figure 3:
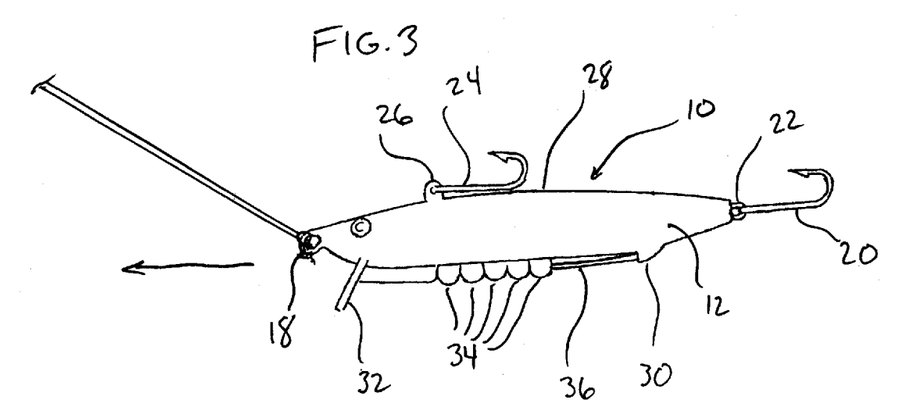
FIG. 3 is a left side elevational view of the lure shown in FIG. 1, with the weights toward the front end of the lure.
Figure 4:
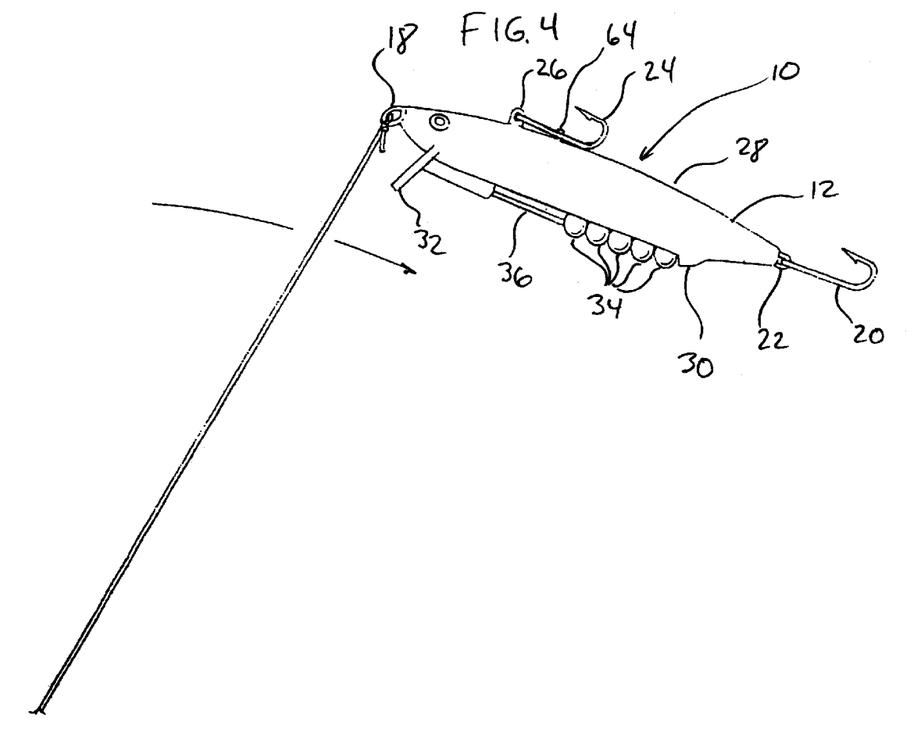
FIG. 4 is a left side elevational view of the lure shown in FIG. 1, with the weights toward the rear end of the lure.
Figures 5, 6, 7:
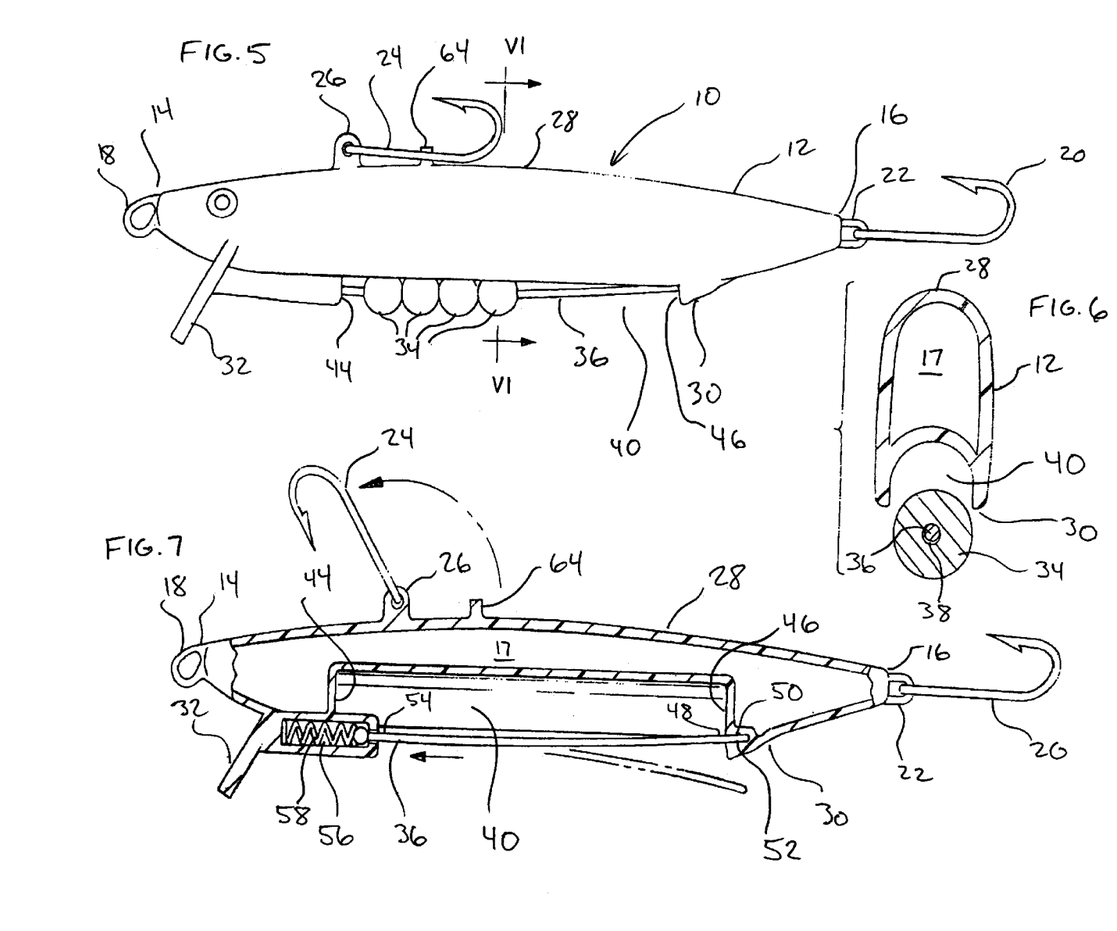
FIG. 5 is an enlarged side elevational view of the lure shown in FIG. 1.
FIG. 6 is a transverse cross-section taken along line VI—VI of FIG. 5.
FIG. 7 is a longitudinal cross-section through the lure of FIG. 1.

FIGS. 1 to 7 illustrate a fishing lure 10 according to a first preferred embodiment of the invention. Lure 10 comprises a lure body 12 which, as shown in the drawings, may preferably be elongate and defines a longitudinal axis L extending between its front end 14 and its rear end 16. The lure body 12 may preferably be shaped and colored to resemble a bait fish. Preferably, the lure body 12 is formed from a buoyant material such as wood or plastic. As shown in FIG. 6, the lure body may be formed from a molded plastic material, and may preferably have a hollow interior 17.

Figures 1, 2:
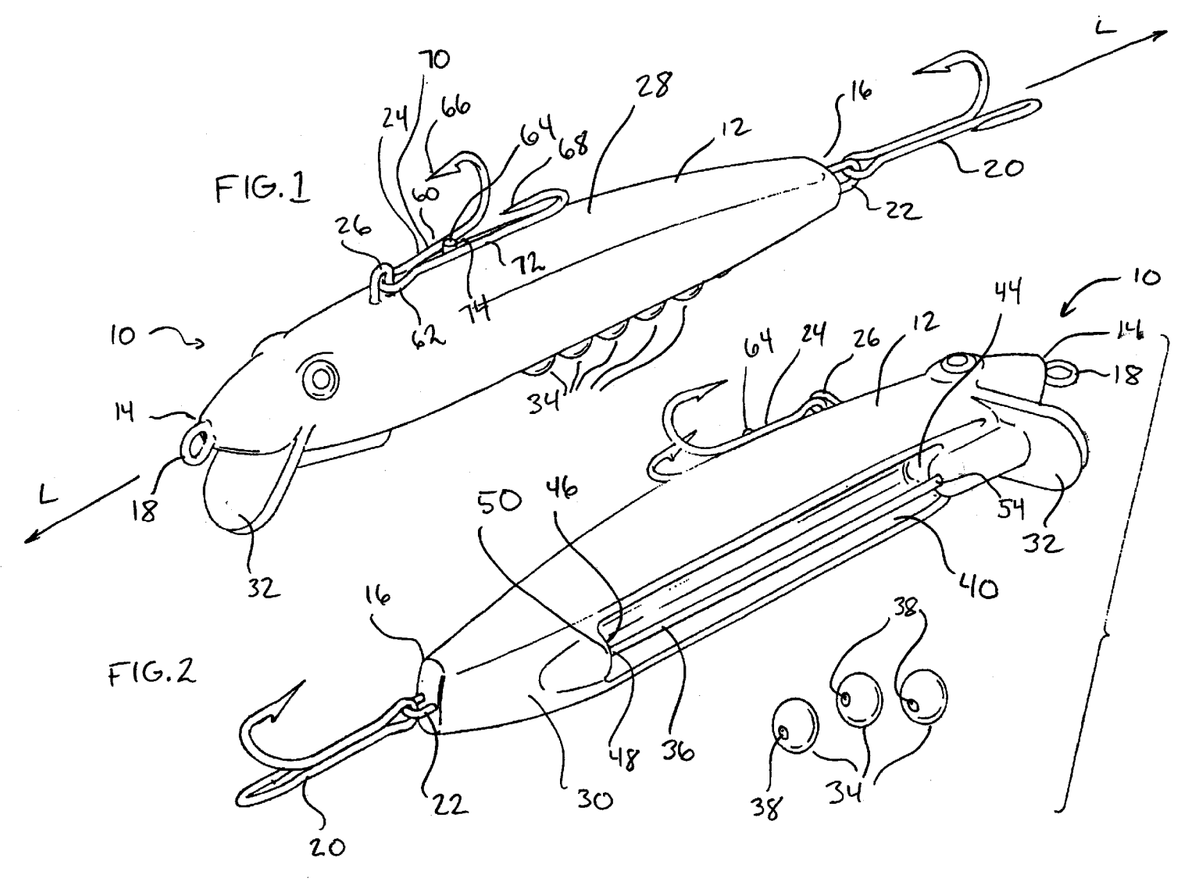
FIG. 1 is a front, left side perspective view of a fishing lure according to a first preferred embodiment of the present invention, taken from the top thereof.
FIG. 2 is a rear, right side perspective view of the lure shown in FIG. 1, taken from the bottom, and showing the weights removed from the lure.

The lure body 12 is provided with means for attachment of a fishing line at its front end, preferably comprising a wire eyelet 18 secured at the front end 14 of lure body 12.

Attached to lure body 12 are one or more fish hooks. In the first preferred embodiment, a rear fish hook 20 is attached to a wire eyelet 22 provided at the rear end 16 of lure body 12, and a front fish hook 24 is attached to a wire eyelet 26 provided in the upper surface 28 of the lure body 12. In the first preferred embodiment, the fish hooks 20 and 24 are double hooks, each having two points. However, it will be appreciated that the lure according to the invention may be provided with more or fewer fish hooks, and that the fish hooks may have more or fewer points.

FIG. 2 more clearly illustrates the lower surface 30 of lure body 12. A forwardly extending diving lip 32 is provided proximate the front end 14 of lure body 12. Rearward of the diving lip 32, the lure 10 is provided with one or more weights 34 which are mounted along the lower surface 30, and is further provided with releasable weight mounting means for retaining the weights 34 along the lower surface 30. Preferably, mounting means comprises a resilient, metal mounting wire 36 which extends longitudinally between the front and rear ends 14, 16 of the lure body 12. The weights 34 are movable along the mounting wire 36 and preferably are releasably secured to the mounting wire 36. Movement of weights 34 along longitudinal axis L shifts the center of gravity of the lure body 12 toward the front end 14 or the rear end 16 of lure body 12. The mounting wire 36 is at least partially detachable from the lure body 12 to release the weights 34 from the lower surface 30 of the lure body 12. Preferably, as shown in FIG. 2, each of the weights 34 is spherical and is provided with a central aperture 38 extending completely through it, the aperture 38 being of sufficient diameter to receive the mounting wire 36 and permit free sliding movement of the weights 34 along the mounting wire 36 between the front and rear ends 14, 16 of the lure body 12.

Preferably, the lower surface 30 of the lure body 12 is provided with an open channel 40 inside which the weights 34 are at least partially received. As shown in FIG. 6, it is preferred that the weights 34 are only partially received inside the open channel 40 so that they protrude from the channel 40 and extend below the lower surface 30 of the lure body 12. This provides the lure with the lowest possible center of gravity, thereby enhancing the lure action and preventing undesirable "rolling" of the lure. The open channel 40 has a front wall 44 at its front end and a rear wall 46 at its rear end, and extends longitudinally between the front and rear ends 14, 16 of the lure body 12, with the mounting wire 36 extending between the front and rear walls 44, 46 of channel 40. Preferably, as shown in FIG. 6, the open channel 40 has a generally semi-circular transverse cross-section, with a radius of the open channel 40 being greater than a radius of the weights 34, thereby permitting the weights 34 to be received inside the channel 40.

Preferably, at least one end of the mounting wire 36 is releasably secured to the lure body 12, and is preferably secured at one end of the open channel 40. The other end of the mounting wire is preferably permanently secured at the other end of the channel. The end of the open channel 40 at which the mounting wire is permanently secured is preferably provided with a spring which biases the mounting wire 36 toward the other end of the channel 40, and wherein longitudinal movement of the mounting wire 36 against the bias of the spring by a sufficient amount frees the releasable end of the mounting wire.

As shown in FIG. 7, the rear end of mounting wire 36 is preferably provided with a releasable catch 50 which, in the preferred embodiment shown in FIG. 7, comprises an aperture 52 in the rear wall 46 of open channel 40. The rear end 48 of mounting wire 36 is releasable from catch 50, and the released position of the mounting wire 36 is shown in dashed lines in FIG. 7. As shown, the mounting wire is sufficiently flexible such that, with its rear end 48 released from the lure body 12, the mounting wire 36 is bendable away from the lure body 12 by a sufficient amount to permit removal or addition of weights 34 to or from the mounting wire 36.

As shown in FIG. 7, the mounting wire 36 is pushed toward the front end 14 of lure body 12 in order to release it from the releasable catch 50. This longitudinal movement of mounting wire 36 is provided by resilient securement of the forward end 54 of mounting wire 36 at the front wall 44 of channel 40. Preferably, as shown in FIG. 7, the front wall 44 of channel 40 is provided with a compartment 56 which contains a longitudinally biased coil spring 58 engaging the forward end 54 of the mounting wire 36. Furthermore, the front end 54 of wire 36 is enlarged in order to prevent it from becoming removed from the compartment 56.

It will be appreciated that other types of releasable catch mechanisms can be provided which will secure the weights 34 along the lower surface 30 of lower body 12 in the manner shown in the drawings. Furthermore, it will be appreciated that the releasable catch 50 may be provided at the front wall 44 of channel 40 and the means for resiliently securing the fixed end of the mounting wire 36 may be provided at the rear wall 46 of channel 40.

In use, the lure 10 is attached to a fishing line in the manner shown in FIG. 3 and is cast into a body of water. As the lure is cast, the weights will move toward the rear end 16 as shown in FIG. 4. Thus, the lure will travel through the air with its front end 14 trailing the rear end 16, avoiding line tangling and permitting longer casting of the lure. When the lure is then drawn through the water as shown in FIG. 3, the front end 14 of the lure will be drawn downwardly by the influence of the diving lip 32, and the weights 34 will move toward the front end 14 to enhance the swimming action of the lure 10.

The lure 10 according to the first preferred embodiment is also provided with a mechanism, described below, by which the front hook 24 is releasably secured to the upper surface 28 of the lure body 12. This feature is illustrated in FIGS. 5 and 7. As mentioned above, the upper surface 28 of the lure body 12 is provided with hook mounting means in the form of eyelet 26. The shank 60 of front hook 24 is provided with a loop eye 62 by which it is attached to eyelet 26 in a manner which permits the hook 24 to move relative to eyelet 26 and lure body 12 both in longitudinal and transverse directions.

The upper surface 28 of the lure body 12 is provided with releasable hook mounting means, preferably in the form of projection 64, which releasably holds the shank 60 of the front hook 24 in a longitudinal, rearwardly-directed orientation along the upper surface 28 of the lure body 12. The front hook 24 is releasable from the protrusion 64 in response to application of a force which separates the front hook 24 away from the lure body 12. Preferably, the amount of force required to separate hook 24 from protrusion is such that the hook 24 and protrusion 64 remain in engagement during casting and retrieval of the lure 10, and such that the hook 24 becomes separated from protrusion 64 when the lure 10 is struck by a fish.

In the preferred embodiment shown in FIGS. 1 to 7, the front hook 24 is a double hook having two points 66, 68, and wherein the shank 60 is comprised of a pair of wires 70, 72 connected to points 66, 68 respectively. The wires 70, 72 comprising shaft 60 are separated by a gap 74 of sufficient dimension such that the protrusion 64 can be received in a friction fit between wires 70, 72.

Figure 8:
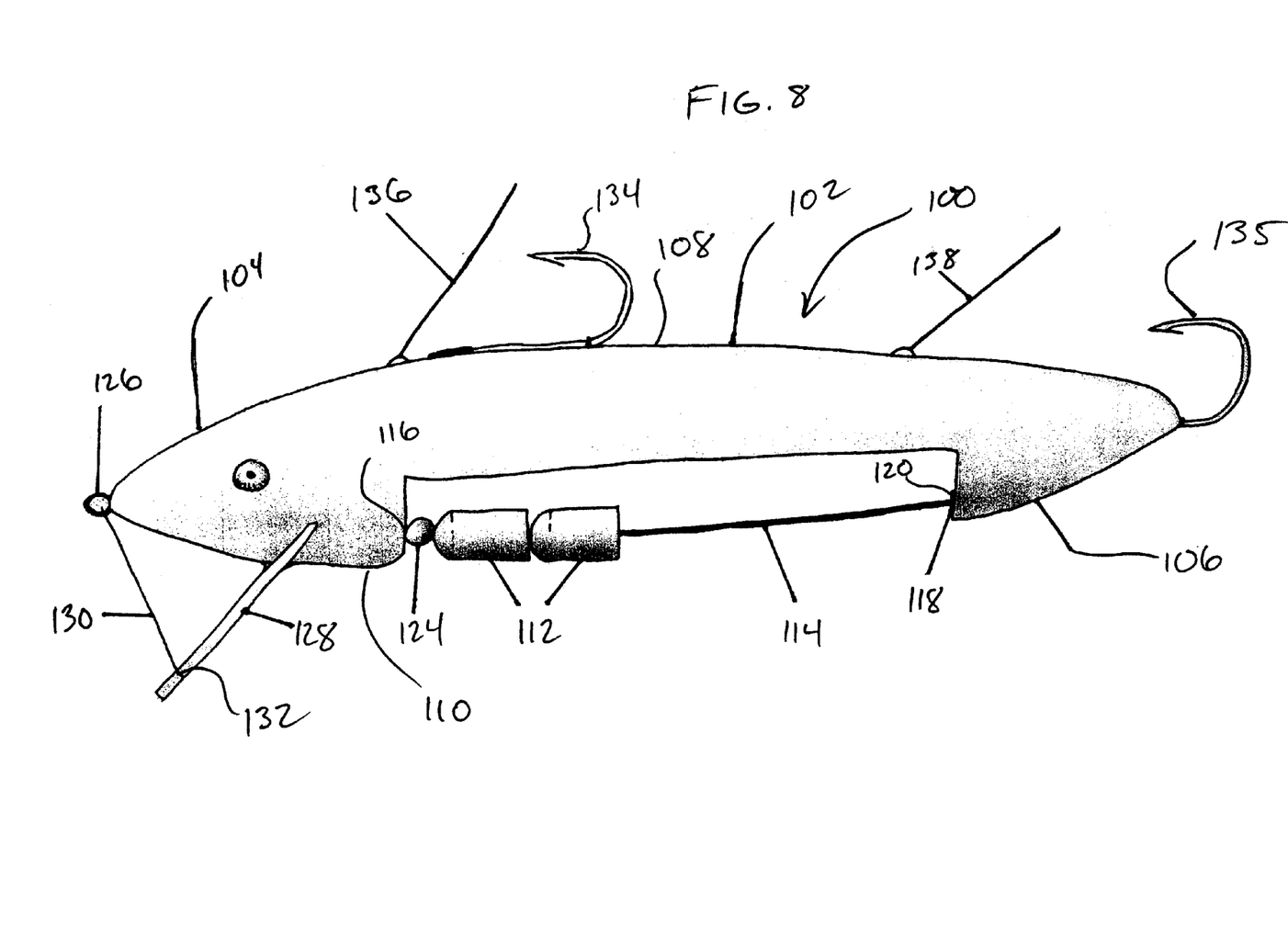
FIG. 8 is a side elevation view of a lure according to a second preferred embodiment of the invention.
Figure 9:
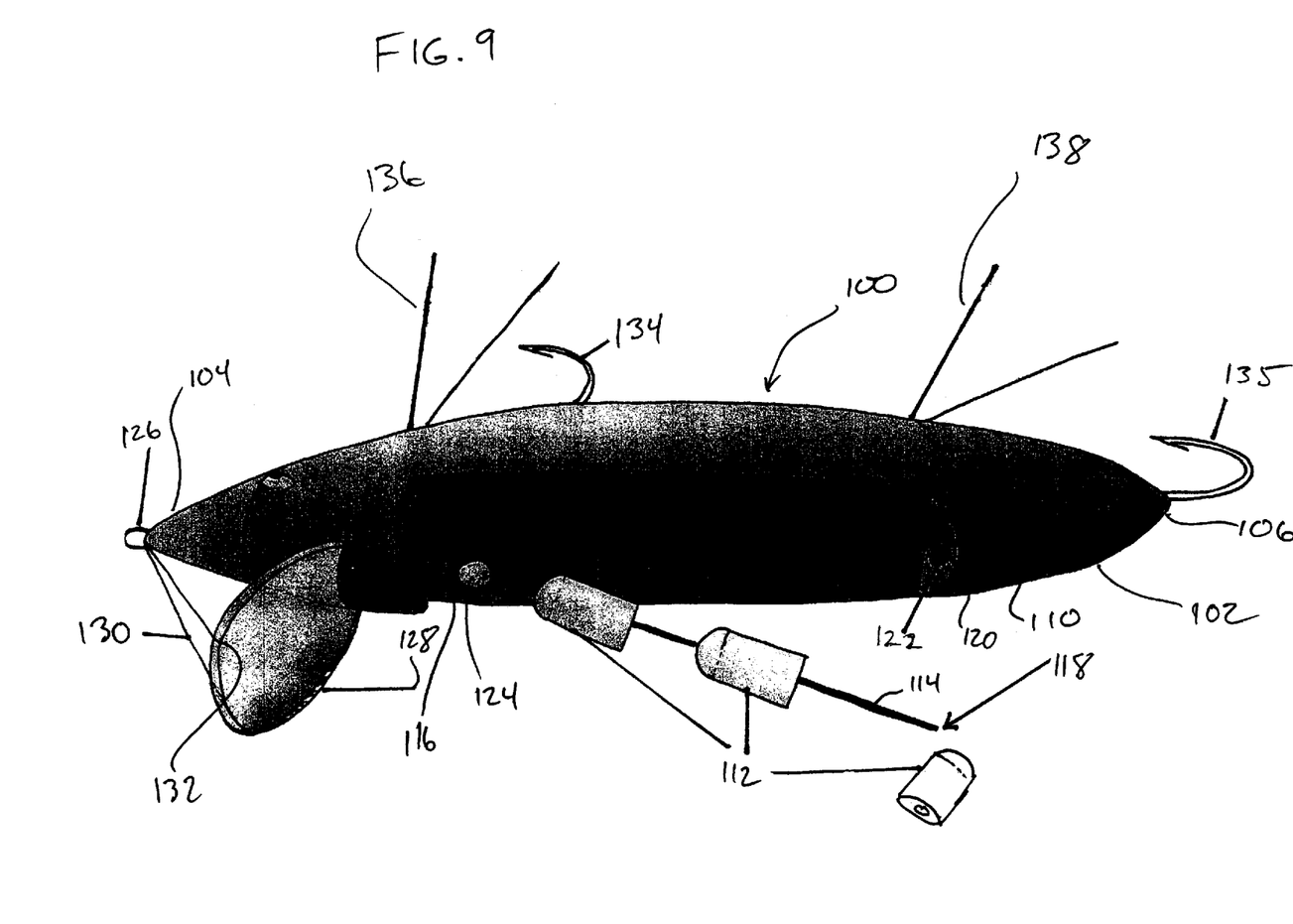
FIG. 9 is a bottom, left side perspective view of the lure shown in FIG. 8.
Figure 10:
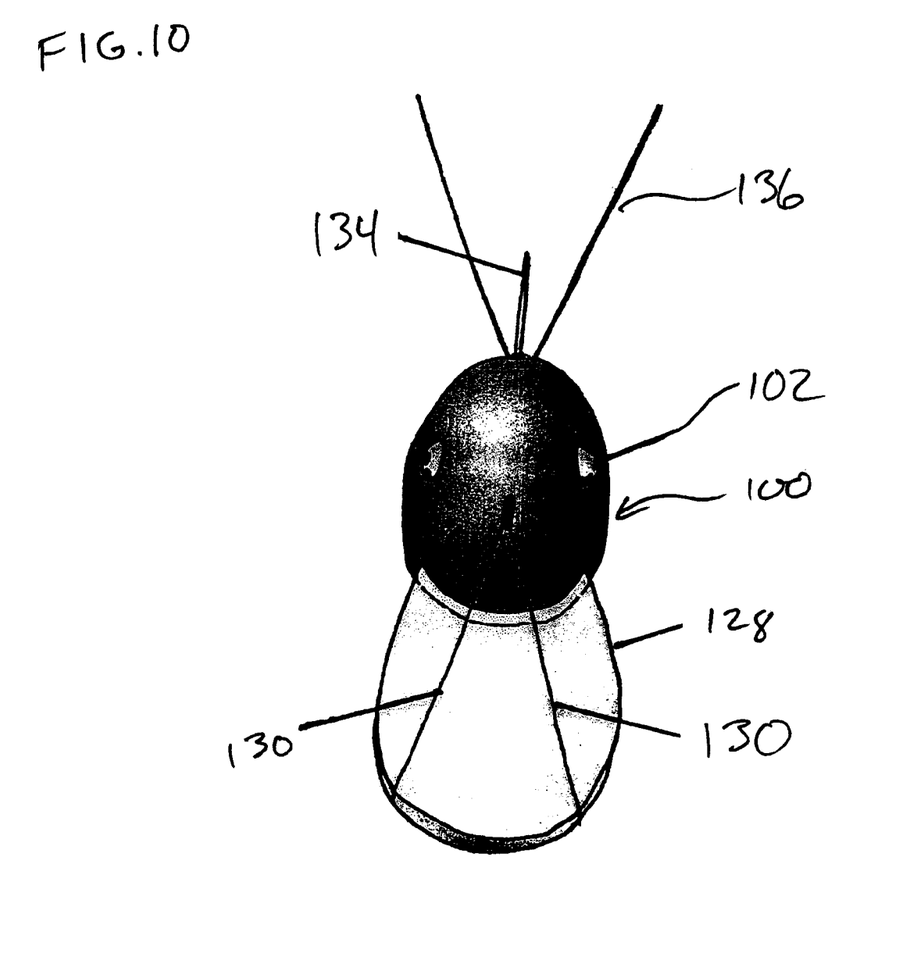
FIG. 10 is a front elevation view of the lure shown in FIG. 8.

A second preferred fishing lure 100 according to the present invention is illustrated in FIGS. 8, 9 and 10. The lure 100 comprises a lure body 102 having a front end 104 and a rear end 106, and also having an upper surface 108 and a lower surface 110 provided with one or more detachable weights 112. The weights 112 are attached to and slidable along a single length of resilient wire 114 having one end 116 permanently secured proximate the front end 104 of lure body 102 and the rear end 118 being releasably secured inside a rivet 120 having a centrally located hole 122. The rear end 118 of the wire 114 is removable from rivet 120 by bending it downwardly as shown in FIG. 9. One or more weights 112 and/or plastic beads 124 can then be added to or removed from the resilient wire 114. The wire 114 is then re-connected to the lure body 102 by positioning its rear end 118 in the hole 122 of rivet 120.

As in the first preferred embodiment of the invention, the front end 104 of lure body 102 is provided with an eyelet 126 for attachment of a fishing line (not shown). On the lower surface 110 rearward of the front end 104 is a diving lip 128 which is appropriately angled. The front end 104 is also provided with a weed guard 130 as shown in FIG. 10, which is preferably constructed from a single strand of resilient wire and is generally V-shaped with U-shaped hook 132 at each end. The U-shaped hooks 132 are preferably perpendicular to the plane of the guard 130. The pointed end of the V-shaped weed guard 130 is connected through eyelet 126 and the pair of U-shaped hooks 132 engage the outer edges of the diving lip 128 so as to be flush with the outer edge of lip 128. The plane of the weed guard 130 forms an angle of less than 90° with the plane of the lip 128.

The upper surface of the lure body 102 is preferably provided with a plurality of single hooks 134, 135 which are securely attached to the lure body 102 by rust-proof screws or the like, allowing for replacement of damaged hooks. Front hook 134 is mounted on the upper surface intermediate the front and rear ends 104, 106, and rear hook 135 is mounted at the rear end 106 of the lure body 102. Each hook 134, 135 is preferably provided with a weed guard 136, 138, the weed guards being mounted forward of the hooks 134, 135 as shown in FIG. 8. Each weed guard 136, 138 is generally V-shaped as shown in FIG. 10 and is constructed of a single strand of resilient wire. The lure body 102 is constructed of a buoyant material, preferably either wood or an injection molded plastic. The shapes and sizes of the weights are variable and depend on the type of action required and the size of the lure. The use of one or more plastic beads either in front of or behind the weights will cause a change in the balance of the lure.

Although the invention has been described in connection with certain preferred embodiments, it is not intended to be limited thereto. Rather, the invention is intended to include all embodiments which may fall within the scope of the following claims.

What is claimed is:

1. A fishing lure, comprising:
   (a) a lure body having a longitudinal axis, a front end, rear end, upper surface and lower surface;
   (b) means for attachment of a fishing line provided at the front end of the lure body;
   (c) one or more fish hooks attached to the lure body;
   (d) one or more weights mounted along the lower surface of the lure body;
   (e) a releasable weight mounting means for retaining the one or more weights along the lower surface of the lure body,
   wherein the one or more weights are movable along the mounting means to shift a center of gravity of the lure body toward the front end or the rear end, and wherein the releasable mounting means is at least partially detachable from the lure body to release the one or more weights from the lower surface of the lure body;
   wherein the lower surface of the lure body is provided with an open channel inside which the one or more weights are at least partially received, the open channel having a first end and a second end and extending longitudinally between the front and rear ends of the lure body, wherein the mounting means extends longitudinally between the first and second ends of the open channel;
   wherein the mounting means comprises a mounting wire having first and second ends, the first end being releasably received in an aperture in the first end of the open channel, and the second end being resiliently secured to the second end of the open channel;
   wherein the second end of the open channel is provided with spring means which bias the mounting means toward the first end of the channel, and wherein longitudinal movement of the mounting means against the bias of the spring means by a sufficient amount releases the first end of the mounting means from the aperture in the first end of the open channel; and
   wherein the second end of the open channel is provided with a compartment in which the second end of the mounting member is movable by a limited amount, the compartment containing a longitudinally biased coil spring which engages the second end of the mounting means.

2. The fishing lure according to claim 1, wherein a first end of the mounting means is provided with a releasable catch, and wherein the mounting means is sufficiently flexible such that, with the first end of the mounting means released from the lure body, the mounting means is bendable away from the lure body by a sufficient amount to permit removal of the one or more weights.

3. The fishing lure according to claim 1, wherein the one or more weights are apertured to receive the mounting means and wherein the one or more weights are freely slidable along the mounting means between the front end and the rear end of the lure body.

4. The fishing lure according to claim 1, wherein the lure body is buoyant.

5. The fishing lure according to claim 1, wherein the one or more weights are partially received inside the open channel such that the one or more weights protrude from the open channel and extend below the lower surface of the lure body.

6. The fishing lure according to claim 1 further comprising a diving lip proximate the front end of the lure body.

7. The fishing lure according to claim 1, wherein the upper surface of the lure body is provided with hook mounting means, and wherein one of the fish hooks is a top-mounted hook having a shank attached to the hook mounting means in a manner such that the hook is movable relative to the hook mounting means and the lure body.

8. The fishing lure according to claim 7, wherein the upper surface of the lure body is provided with releasable hook retaining means which releasably holds the shank of the top-mounted hook in a longitudinal orientation along the upper surface of the lure body, the top-mounted hook being releasable from the hook retaining means in response to application of a force separating the top-mounted hook away from the lure body.

9. The fishing lure according to claim 8, wherein the top-mounted hook has two points, and wherein the shank comprises a pair of wires, each connected to one of the points, and wherein the hook retaining means comprises a protrusion on the upper surface of the lure body which is received in a friction fit between the pair of wires comprising the shank of the top-mounted hook.

10. A fishing lure, comprising:
(a) a lure body having a longitudinal axis, a front end, rear end, upper surface and lower surface;
(b) means for attachment of a fishing line provided at the front end of the lure body;
(c) one or more fish hooks attached to the lure body;
(d) one or more weights mounted along the lower surface of the lure body;
(e) a releasable weight mounting means for retaining the one or more weights along the lower surface of the lure body;
wherein the one or more weights are movable along the mounting means to shift a center of gravity of the lure body toward the front end or the rear end, and wherein the releasable mounting means is at least partially detachable from the lure body to release the one or more weights from the lower surface of the lure body;
wherein the upper surface of the lure body is provided with hook mounting means, and wherein one of the fish hooks is a top-mounted hook having a shank attached to the hook mounting means in a manner such that the hook is movable relative to the hook mounting means and the lure body;
wherein the upper surface of the lure body is provided with releasable hook retaining means which releasably holds the shank of the top-mounted hook in a longitudinal orientation along the upper surface of the lure body, the top-mounted hook being releasable from the hook retaining means in response to application of a force separating the top-mounted hook away from the lure body; and
wherein the top-mounted hook has two points, and wherein the shank comprises a pair of wires, each connected to one of the points, and wherein the hook retaining means comprises a protrusion on the upper surface of the lure body which is received in a friction fit between the pair of wires comprising the shank of the top-mounted hook.

11. The fishing lure according to claim 10, wherein the one or more weights are releasably secured to the mounting means.

12. The fishing lure according to claim 10, wherein the mounting means extends longitudinally between the front and rear ends of the lure body.

13. The fishing lure according to claim 10, wherein the mounting means comprises a mounting wire which extends longitudinally between the front and rear ends of the lure body, and wherein at least one end of the mounting means is releasably secured to the lure body.

14. The fishing lure according to claim 13, wherein a first end of the mounting means is provided with a releasable catch, and wherein the mounting means is sufficiently flexible such that, with the first end of the mounting means released from the lure body, the mounting means is bendable away from the lure body by a sufficient amount to permit removal of the one or more weights.

15. The fishing lure according to claim 13, wherein the one or more weights are apertured to receive the mounting means and wherein the one or more weights are freely slidable along the mounting means between the front end and the rear end of the lure body.

16. The fishing lure according to claim 10, wherein the lower surface of the lure body is provided with an open channel inside which the one or more weights are at least partially received, the open channel having a first end and a second end and extending longitudinally between the front and rear ends of the lure body, wherein the mounting means extends longitudinally between the first and second ends of the open channel.

17. The fishing lure according to claim 16, wherein the mounting means comprises a mounting wire having first and second ends, the first end being releasably received in an aperture in the first end of the open channel, and the second end being resiliently secured to the second end of the open channel.

18. The fishing lure according to claim 17, wherein the second end of the open channel is provided with spring means which bias the mounting means toward the first end of the channel, and wherein longitudinal movement of the mounting means against the bias of the spring means by a sufficient amount releases the first end of the mounting means from the aperture in the first end of the open channel.

19. The fishing lure according to claim 18, wherein the first end of the open channel is proximate the rear end of the lure body.

20. The fishing lure according to claim 18, wherein the second end of the open channel is proximate the front end of the lure body.

\* \* \* \* \*